US012774798B2

(12) United States Patent
Ariyama

(10) Patent No.: US 12,774,798 B2

(45) Date of Patent: Oct. 27, 2026

(54) VEHICLE LAMP

(71) Applicant: STANLEY ELECTRIC CO., LTD., Tokyo (JP)

(72) Inventor: Yuya Ariyama, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 19/385,938

(22) Filed: Nov. 11, 2025

(65) Prior Publication Data

US 2026/0132904 A1 May 14, 2026

(30) Foreign Application Priority Data

Nov. 14, 2024 (JP) ................................ 2024-199264

(51) Int. Cl.

*F21S 43/31* (2018.01)

*F21S 43/235* (2018.01)

(Continued)

(52) U.S. Cl.

CPC ............. *F21S 43/31* (2018.01); *F21S 43/237* (2018.01); *F21S 43/239* (2018.01);

(Continued)

(58) Field of Classification Search

CPC .......... F21S 43/31; F21S 43/41; F21S 43/237; F21S 43/239; F21S 43/241; F21S 43/247;

(Continued)

(56) References Cited

U.S. PATENT DOCUMENTS 12,311,833 B1 * 5/2025 Johnson .................. B60Q 1/28

2018/0003882 A1 * 1/2018 Paroni ................. G02B 6/0036

(Continued)

FOREIGN PATENT DOCUMENTS

JP 6918653 B2 * 8/2021

JP 7034750 B2 3/2022

*Primary Examiner* — Erin Kryukova

(74) *Attorney, Agent, or Firm* — Kenealy Vaidya LLP

(57) ABSTRACT

In a vehicle lamp, a light guide body includes a rod-shaped first-light-guide-portion extending from one-end-side of the first-light-guide-portion facing a light source to other-end-side of the first-light-guide-portion, a plate-shaped second-light-guide-portion extending in a first-direction in which the first-light-guide-portion extends and a second-direction intersecting the first-direction, a third-light-guide-portion extending in the first-direction and a third-direction intersecting the first-direction and the second-direction and that establishes connection between the first-light-guide-portion and the second-light-guide-portion in the first-direction, an incidence-portion located on the one-end-side of the first-light-guide-portion, a reflection-portion located on one surface side of the second-light-guide-portion, an emission-portion located on the other surface side of the second-light-guide-portion, and a groove-portion located on the one surface side of the second-light-guide-portion which is closer to a third-light-guide-portion compared to the reflection-portion and extending in the first-direction. A depth of the groove-portion gradually decreases from the one-end-side of the first-light-guide-portion toward the other-end-side of the first-light-guide-portion.

4 Claims, 4 Drawing Sheets

(51) Int. Cl.
*F21S 43/237* (2018.01)
*F21S 43/239* (2018.01)
*F21S 43/241* (2018.01)
*F21S 43/247* (2018.01)
*F21W 103/35* (2018.01)
*F21Y 101/00* (2016.01)

(52) U.S. Cl.
CPC ........... *F21S 43/241* (2018.01); *F21S 43/247* (2018.01); *F21S 43/252* (2024.05); *F21W 2103/35* (2018.01); *F21Y 2101/00* (2013.01)

(58) Field of Classification Search
CPC .. F21S 43/245; F21S 43/252; F21W 2103/35; F21W 2103/45; G02B 6/005; G02B 6/0033; G02B 6/0011; G02B 6/0036; G02B 6/004; G02B 6/0043; F21Y 2101/00
See application file for complete search history.

(56) References Cited

U.S. PATENT DOCUMENTS

2018/0306399 A1* 10/2018 Rabek .................... F21S 43/40
2021/0041079 A1* 2/2021 Seok .................... B60Q 1/0041
2022/0107072 A1* 4/2022 Tanaka .................... F21S 41/25

* cited by examiner

1

VEHICLE LAMP

CROSS-REFERENCE TO RELATED APPLICATION

Priority is claimed on Japanese Patent Application No. 2024-199264, filed Nov. 14, 2024, the content of which is incorporated herein by reference.

BACKGROUND OF THE INVENTION

Field of the Invention

The present invention relates to a vehicle lamp.

Description of Related Art

Conventionally, as a vehicle lamp mounted on a vehicle, a vehicle lamp in which a light source such as a light-emitting diode (LED) and a light guide body with a plate or rod shape or the like are combined is known (for example, see Japanese Patent No. 7034750).

In such a vehicle lamp, light emitted from the light source enters from a base end side of the light guide body and guided toward a tip end side of the light guide body while repeating reflection at inside the light guide body. Moreover, light reflected by a plurality of reflection cuts provided on a rear side of the light guide body is emitted from a front side of the light guide body. Thereby, a light-emitting portion provided on the front side of the light guide body can emit light in a line or surface form.

SUMMARY OF THE INVENTION

Meanwhile, in the above-described conventional vehicle lamp, luminance unevenness may occur in a light-emitting portion due to a difference in an optical path length of the light guided from a base end side to a tip end side of a light guide body. That is, when luminance unevenness occurs in the light-emitting portion of the light guide body, an amount of light at the tip end side, where the optical path length from the light source is longer, is relatively lower than that at the base end side, where the optical path length from the light source is shorter, due to attenuation of light and the like in a direction in which the light guide body extends. Accordingly, because such a difference in an amount of light (luminance) is recognized as luminance unevenness of the light-emitting portion, it becomes difficult to cause the entire light-emitting portion to emit light uniformly.

An aspect of the present invention is to provide a vehicle lamp that enables more uniform light emission.

An aspect of the present invention provides the following configuration:

[1] A vehicle lamp including:

a light source; and a light guide body configured to guide light emitted from the light source, wherein the light guide body includes a rod-shaped first light guide portion that is extending from one end side of the first light guide portion facing the light source to other end side of the first light guide portion;

a plate-shaped second light guide portion that is extending in a first direction in which the first light guide portion extends and a second direction intersecting the first direction;

a third light guide portion that is extending in the first direction and a third direction intersecting the first direction and the second direction and that is configured to establish a connection between the first light guide portion and the second light guide portion in the first direction;

an incidence portion that is located on the one end side of the first light guide portion and that is configured to cause light emitted from the light source to enter an inner side of the first light guide portion;

a reflection portion that is located on one surface side of the second light guide portion and that is configured to reflect light guided inside the second light guide portion toward other surface side of the second light guide portion;

an emission portion that is located on the other surface side of the second light guide portion and that is configured to emit the light reflected by the reflection portion to an outer side of the second light guide portion; and a groove portion that is located on the one surface side of the second light guide portion which is closer to a third light guide portion compared to the reflection portion and that is extending in the first direction, wherein a depth of the groove portion gradually decreases from the one end side of the first light guide portion toward the other end side of the first light guide portion.

[2] In the vehicle lamp according to the above-described aspect [1], a length of the third light guide portion in the third direction gradually decreases from the one end side of the first light guide portion toward the other end side of the first light guide portion.

[3] In the vehicle lamp according to the above-described aspect [1], a thickness of the first light guide portion gradually decreases from the one end side of the first light guide portion toward the other end side of the first light guide portion.

[4] In the vehicle lamp according to the above-described aspect [1], the reflection portion includes a plurality of reflection cuts arranged in the first direction, and the reflection cuts gradually increase in size from the one end side of the first light guide portion toward the other end side of the first light guide portion.

According to the aspects of the present invention, it is possible to provide a vehicle lamp that enables more uniform light emission.

DETAILED DESCRIPTION OF THE INVENTION

Figure 1:
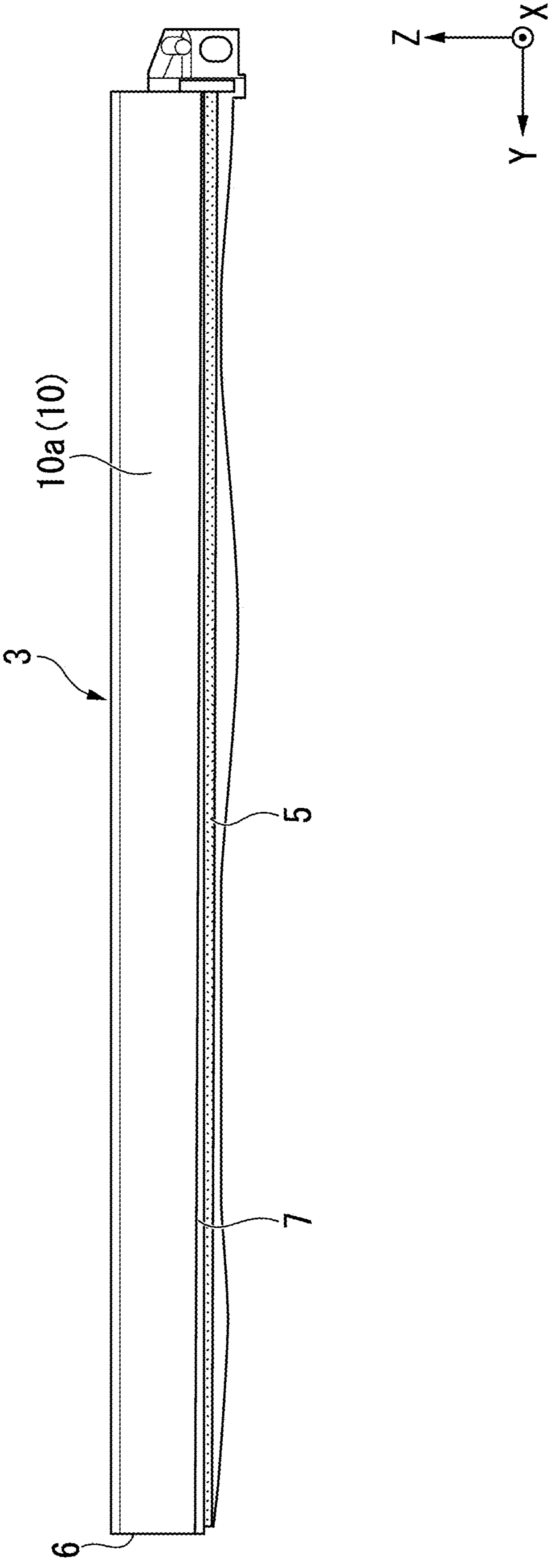
FIG. 1 is a front view showing a configuration of a vehicle lamp according to an embodiment of the present invention.

Hereinafter, embodiments of the present invention will be described in detail with reference to the drawings.

In the drawings used in the following description, dimensions of constituent elements may be shown with different scales for ease of understanding, and dimensional ratios of the respective constituent elements are not necessarily the same as in reality.

As an embodiment of the present invention, a vehicle lamp 1 shown in FIGS. 1 to 4 will be described.

Figure 2:
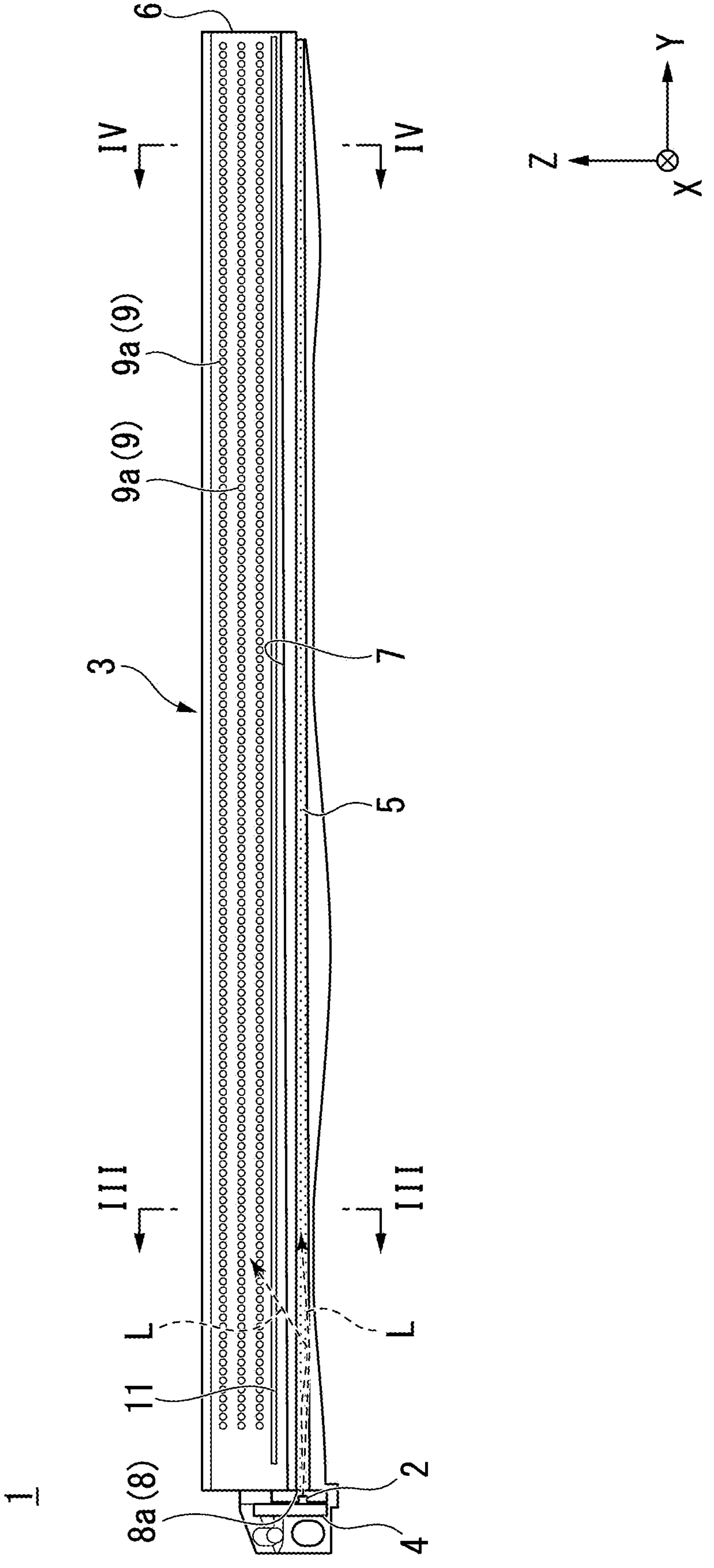
FIG. 2 is a rear view showing a configuration of the vehicle lamp shown in FIG. 1.
Figure 3:
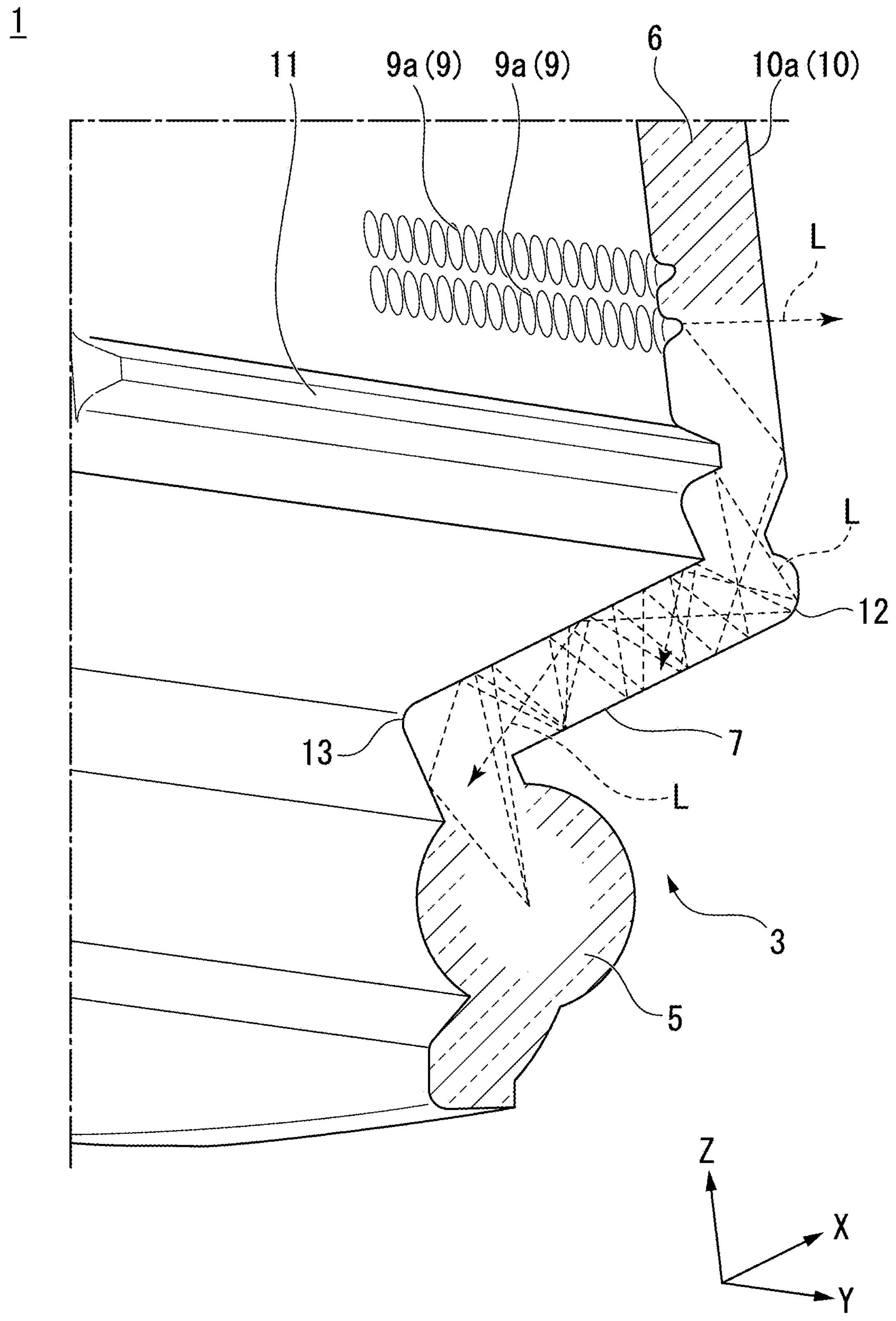
FIG. 3 is a sectional perspective view of the vehicle lamp taken along line III-III shown in FIG. 2.
Figure 4:
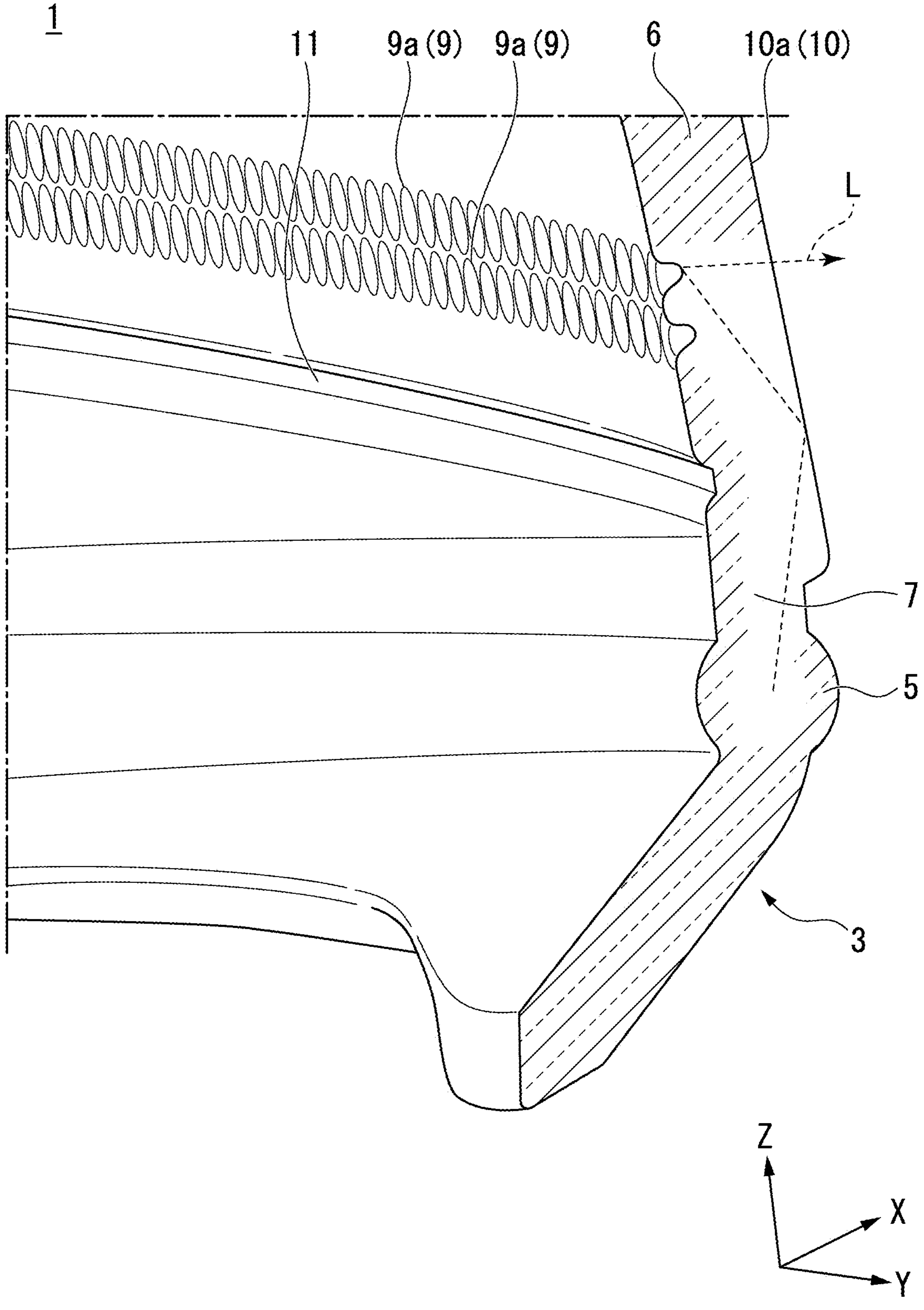
FIG. 4 is a sectional perspective view of the vehicle lamp taken along line IV-IV shown in FIG. 2.

In addition, FIG. 1 is a front view showing a configuration of the vehicle lamp 1. FIG. 2 is a rear view showing the configuration of the vehicle lamp 1. FIG. 3 is a sectional perspective view of the vehicle lamp 1 taken along line III-III shown in FIG. 2. FIG. 4 is a sectional perspective view of the vehicle lamp 1 taken along line IV-IV shown in FIG. 2.

Moreover, in the drawings shown below, an XYZ orthogonal coordinate system is defined so that an X-axis direction represents a front-rear direction of the vehicle lamp 1, a Y-axis direction represents a left-right direction of the vehicle lamp 1, and a Z-axis direction represents an up-down direction of the vehicle lamp 1.

In the vehicle lamp 1 of the present embodiment, for example, the present invention is applied to a tail lamp that emits red light within rear combination lamps mounted at both rear corner portions of a vehicle (not shown).

In the following description, unless otherwise specified, it is assumed that the terms "front," "rear," "left," "right," "up," and "down" refer to the respective directions when the vehicle lamp 1 is viewed from the front (the rear side of the vehicle). Therefore, the front, rear, left, and right directions are reversed from the directions when the vehicle is viewed from the front (the front side of the vehicle).

As shown in FIGS. 1 and 2, the vehicle lamp 1 of the present embodiment includes a light source 2 and an inner lens 3, and has a structure arranged inside a lamp body (not shown) constituting the rear combination lamp.

In addition, the lamp body includes a housing having a front opening and an outer lens (cover lens) configured to cover the opening of the housing. In addition, the shape of the lamp body can be appropriately modified according to a vehicle design or the like.

Moreover, in addition to the light source 2 and the inner lens 3 described above, for example, members such as an extension and a bracket can be arranged inside the lamp body and the members can also be attached inside the lamp body.

As shown in FIG. 2, the light source 2 includes, for example, a light-emitting element such as an LED that emits red light. The light source 2 is mounted on one surface side of a circuit board 4 where a drive circuit (not shown) for driving the light source 2 is provided and radially emits light L toward the side (+Y-axis side) of the vehicle lamp 1.

As shown in FIGS. 1 to 4, the inner lens 3 is an elongated light guide body that guides the light L emitted from the light source 2, and, for example, is made of a light-transmissive member such as glass or a transparent resin of polycarbonate, acrylic, or the like.

The inner lens 3 has an overall curved shape in a direction in which the outer side is recessed than the inner side in the vehicle width direction in accordance with a slant shape applied to a corner portion on the front end or the rear end side of the vehicle. In addition, in the present embodiment, the inner side in the vehicle width direction is defined as one end side of the inner lens 3, and the outer side in the vehicle width direction is defined as the other end side of the inner lens.

The inner lens 3 includes: a rod-shaped first light guide portion 5 that extends from one end side facing the light source 2 to the other end side; a plate-shaped second light guide portion 6 that extends in a first direction in which the first light guide portion 5 extends and a second direction intersecting the first direction; and a third light guide portion 7 that extends in the first direction and a third direction intersecting both the first and second directions and that is configured to connect the first light guide portion and the second light guide portion in the first direction.

In the present embodiment, the first direction is a direction along an optical axis of light L emitted from the light source 2 and corresponds to the left-right direction of the vehicle lamp 1. The second direction corresponds to the up-down direction of the vehicle lamp 1 orthogonal to the first direction. The third direction corresponds to the front-rear direction of the vehicle lamp 1 orthogonal to the first and second directions.

The first light guide portion 5 is formed in an approximately sectional circular shape and its thickness (outer diameter) gradually decreases as it goes toward one end side to the other end side of the first light guide portion 5.

The second light guide portion 6 is located in front of and above the first light guide portion 5 and is formed in an approximately rectangular plate shape with an approximately uniform thickness.

The third light guide portion 7 is formed in a flat plate shape with an approximately uniform thickness, and is connecting between an upper end of the first light guide portion and a lower end of the second light guide portion in the front-rear direction (the third direction) across the left-right direction (the first direction). Moreover, the length of the third light guide portion 7 in the front-rear direction (the third direction) gradually decreases as it goes from one end side toward the other end side of the third light guide portion 7.

The inner lens 3 includes: an incidence portion 8 located at one end side of the first light guide portion 5; a reflection portion 9 located on the rear side, which is one surface of the second light guide portion 6; an emission portion 10 located on the front side, which is the other surface of the second light guide portion 6; and a groove portion 11 located on the third light guide portion 7 side (lower side) of the reflection portion 9 on the rear side of the second light guide portion 6.

The incidence portion 8 has a flat incident surface **8*a* facing the light source 2 on the one end side of the first light guide portion 5. In other words, the incident surface 8*a* forms a plane orthogonal to the optical axis of light L emitted from the light source 2**.

At the incidence portion 8, the light L emitted from the light source 2 enters inside of the first light guide portion 5 from the incident surface **8*a*. Thereby, the light L entered from the incident surface 8*a* is guided to the other end side of the first light guide portion 5 while repeating reflection at inside the first light guide portion 5**.

Moreover, a part of the light L guided inside the first light guide portion 5 enters the inside of the second light guide portion 6 while repeating reflection at inside the third light guide portion 7. Furthermore, the light L entered the inside of the second light guide portion 6 is guided from the lower end side to the upper end side of the second light guide portion 6 while repeating reflection at inside the second light guide portion 6.

The reflection portion 9 has a plurality of reflection cuts **9*a* arranged in the left-right direction (first direction) on the rear side of the second light guide portion 6. It is only necessary for the plurality of reflection cuts 9*a* to reflect the light L entered the rear side of the second light guide portion 6 at an angle of emission to the outer side from the front side of the second light guide portion 6**, and the shape, size, number, and the like of the reflection cuts are not particularly limited.

For example, in the present embodiment, the plurality of reflection cuts 9*a* constitutes a reflection cut array in which approximately conical recesses formed on the rear surface of the second light guide portion 6 are arranged in the left-right direction (the first direction) of the second light guide portion 6. Moreover, a reflection cut group is formed by arranging two reflection cut arrays in parallel to each other.

Moreover, in the plurality of reflection cuts 9*a*, the recesses forming the reflection cuts 9*a* gradually increase in size as it goes from the one end side toward the other end side of the first light guide portion 5. Alternatively, intervals between the adjacent recesses forming the reflection cuts 9*a* may gradually decrease.

At the reflection portion 9, the light L entered the rear side of the second light guide portion 6 is reflected toward the emission portion 10 located on the front side of the second light guide portion 6 by the plurality of reflection cuts 9*a*.

The emission portion 10 has a flat emission surface 10*a* formed on the front side of the second light guide portion 6. Moreover, the emission surface 10*a* forms an overall curved surface extending from one end side to the other end side of the second light guide portion 6 corresponding to the above-described slant shape of the inner lens 3.

In the emission portion 10, the light L reflected by the plurality of reflection cuts 9*a* is emitted from the emission surface 10*a* to the outer side of the second light guide portion 6.

The groove portion 11 is provided to extend in the left-right direction (the first direction) of the second light guide portion 6 while forming a curved recess in cross-sectional view. Moreover, a depth of the groove portion 11 gradually decreases as it goes from the one end side toward the other end side of the second light guide portion 6. On the other hand, a thickness of the portion of the second light guide portion 6 where the groove portion 11 is formed gradually increases as it goes from the one end side toward the other end side of the second light guide portion 6.

In the vehicle lamp 1 of the present embodiment having the above-described configuration, when the light L reflected by the plurality of reflection cuts 9*a* described above is emitted from the emission surface 10*a*, the emission surface 10*a* can serve as the light-emitting portion of a tail lamp and emit red light.

Meanwhile, in the vehicle lamp 1 of the present embodiment, an amount of light at the other end side of the inner lens 3, where the optical path length from the light source 2 shown in FIG. 4 is longer, becomes relatively lower than that at one end side of the inner lens 3, where the optical path length from the light source 2 shown in FIG. 3 is shorter, due to attenuation of light and the like.

In contrast, in the vehicle lamp 1 of the present embodiment, as shown in FIGS. 3 and 4, a thickness (outer diameter) of the first light guide portion 5 gradually decreases from the one end side to the other end side of the first light guide portion 5 as a distance from the light source 2 increases so as to make the light-emitting portion (emission surface 10*a*) of the above-described tail lamp emit light more uniformly. Thereby, compared to when the thickness of the first light guide portion 5 is constant, the light amount of the light L guided from the one end side to the other end side of the first light guide portion 5 relatively increases.

Moreover, in the vehicle lamp 1 of the present embodiment, a length of the third light guide portion 7 in the front-rear direction (third direction) gradually decreases from the one end side to the other end side of the third light guide portion 7 so as to make the light-emitting portion (emission surface 10*a*) of the above-described tail lamp emit light more uniformly. That is, an optical path length of the light L guided from the first light guide portion 5 to the second light guide portion 6 gradually decreases from the one end side to the other end side of the third light guide portion 7.

Specifically, the optical path length of the light L from the first light guide portion 5 to the second light guide portion 6 in the third light guide portion 7 relatively increases at the one end side of the inner lens 3 shown in FIG. 3. Therefore, a light amount of the light L relatively decreases due to attenuation of the light L from the first light guide portion 5 to the second light guide portion 6 and the like while repeating reflection at inside the third light guide portion 7.

Moreover, a part of the light L guided from the first light guide portion 5 to the second light guide portion 6 while repeating reflection at inside the third light guide portion 7 is reflected at the corner portion 12 between the first light guide portion 5 and the third light guide portion 7 or at the corner portion 13 between the third light guide portion 7 and the second light guide portion 6. Thereby, because the light L is returned toward the side in which the first light guide portion 5 is located, the light amount of the light L from the first light guide portion 5 to the second light guide portion 6 in the third light guide portion 7 relatively decreases.

Moreover, a configuration in which reflection surfaces such as a C surface and an R surface is provided at the corner portions 12 and 13 and the light L guided inside the third light guide portion 7 is reflected may be employed. By changing the size, angle, or the like of these reflection surfaces, it is possible to adjust the light amount of the light L from the first light guide portion 5 to the second light guide portion 6 in the third light guide portion 7.

On the other hand, on the other end side of the inner lens 3 shown in FIG. 4, the optical path length of the light L from the first light guide portion 5 to the second light guide portion 6 in the third light guide portion 7 becomes relatively short. Therefore, the light amount of the light L guided from the first light guide portion 5 to the second light guide portion 6 while repeating reflection at inside the third light guide portion 7 relatively increases.

Thereby, in the vehicle lamp 1 of the present embodiment, it is possible to make the light amount of the light L from the first light guide portion 5 to the second light guide portion 6 close to each other between the one end side and the other end side of the third light guide portion 7. That is, a light amount difference of the light L from the first light guide portion 5 to the second light guide portion 6 can be reduced between the one end side and the other end side of the third light guide portion 7.

Moreover, in the vehicle lamp 1 of the present embodiment, a depth of the groove portion 11 gradually decreases as it goes from the one end side toward the other end side of the second light guide portion 6 so as to make the light-emitting portion (emission surface 10*a*) of the above-described tail lamp emit light more uniformly. On the other hand, a thickness of a portion of the second light guide portion 6 where the groove portion 11 is formed gradually increases as it goes from the one end side toward the other end side of the second light guide portion 6.

Specifically, because the thickness of the portion of the second light guide portion 6 where the groove portion 11 is formed relatively decreases on the one end side of the inner lens 3 shown in FIG. 3, the light amount of the light L passing through this portion toward the second light guide portion 6 relatively decreases. Moreover, a part of the light L from the third light guide portion 7 to the second light guide portion 6 is reflected by the groove portion 11 and returned to the side in which the first light guide portion 5 is located.

On the other hand, because the thickness of the portion of the second light guide portion 6 where the groove portion 11 is formed relatively increases on the other end side of the inner lens 3 shown in FIG. 4, the light amount of the light L passing through this portion toward the second light guide portion 6 relatively increases.

Thereby, in the vehicle lamp 1 of the present embodiment, it is possible to make the light amount of the light L from the third light guide portion 7 to the second light guide portion 6 close to each other between the one end side and the other end side of the third light guide portion 7. That is, the light amount difference of the light L from the third light guide portion 7 to the second light guide portion 6 can be reduced between the one end side and the other end side of the third light guide portion 7.

As described above, in the vehicle lamp 1 of the present embodiment, the light amount of the light L reflected by the plurality of reflection cuts 9*a* can be made more uniform between the one end side and the other end side of the second light guide portion 6 so that luminance unevenness does not occur in the light-emitting portion (emission surface 10*a*) of the tail lamp due to an optical path length difference of the light L guided from one end side to the other end side of the inner lens 3.

Thereby, in the vehicle lamp 1 of the present embodiment, luminance unevenness of the light-emitting portion (emission surface 10*a*) of the tail lamp can be suppressed, and the light-emitting portion (emission surface 10*a*) of the tail lamp can emit red light more uniformly. Moreover, it is possible to improve the appearance of the tail lamp when light is emitted by preventing the occurrence of luminance unevenness.

In addition, the present invention is not necessarily limited to the above-described embodiment, and various modifications can be made without departing from the scope of the present invention.

Although, for example, the vehicle lamp 1 to which the present invention is applied, is exemplified as a tail lamp constituting the above-described rear combination lamp in the above-described embodiment, the vehicle lamp to which the present invention is applied is not limited to the above-described tail lamp. For example, the present invention can be widely applied to vehicle lamps such as a position lamp, a daytime running lamp (DRL), a backup lamp, a brake lamp (stop lamp), or a turn lamp.

Moreover, the color of the light L emitted from the light source is not limited to the above-described red light, and can be appropriately changed in accordance with the application of the vehicle lamp of white light, orange light, or the like.

What is claimed is:

1. A vehicle lamp comprising:

a light source; and a light guide body configured to guide light emitted from the light source, wherein the light guide body includes a rod-shaped first light guide portion that is extending from one end side of the first light guide portion facing the light source to the other end side of the first light guide portion;

a plate-shaped second light guide portion that is extending in a first direction in which the first light guide portion extends and a second direction intersecting the first direction;

a third light guide portion that is extending in the first direction and a third direction intersecting the first direction and the second direction and that is configured to establish a connection between the first light guide portion and the second light guide portion in the first direction;

an incidence portion that is located on the one end side of the first light guide portion and that is configured to cause light emitted from the light source to enter an inner side of the first light guide portion;

a reflection portion that is located on one surface side of the second light guide portion and that is configured to reflect light guided inside the second light guide portion to an other surface side of the second light guide portion;

an emission portion that is located on the other surface side of the second light guide portion and that is configured to emit the light reflected by the reflection portion to an outer side of the second light guide portion; and a groove portion that is located on the one surface side of the second light guide portion which is closer to the third light guide portion compared to the reflection portion and that is extending in the first direction, wherein a depth of the groove portion gradually decreases from the one end side of the first light guide portion toward the other end side of the first light guide portion.

2. The vehicle lamp according to claim 1, wherein a length of the third light guide portion in the third direction gradually decreases from the one end side of the first light guide portion toward the other end side of the first light guide portion.

3. The vehicle lamp according to claim 1, wherein a thickness of the first light guide portion gradually decreases from the one end side of the first light guide portion toward the other end side of the first light guide portion.

4. The vehicle lamp according to claim 1, wherein the reflection portion includes a plurality of reflection cuts arranged in the first direction, and wherein the reflection cuts gradually increase in size from the one end side of the first light guide portion toward the other end side of the first light guide portion.

* * * * *